L. BURDY & E. F. MOINE.
RESILIENT WHEEL.
APPLICATION FILED JUNE 14, 1911.
1,026,903.
Patented May 21, 1912.
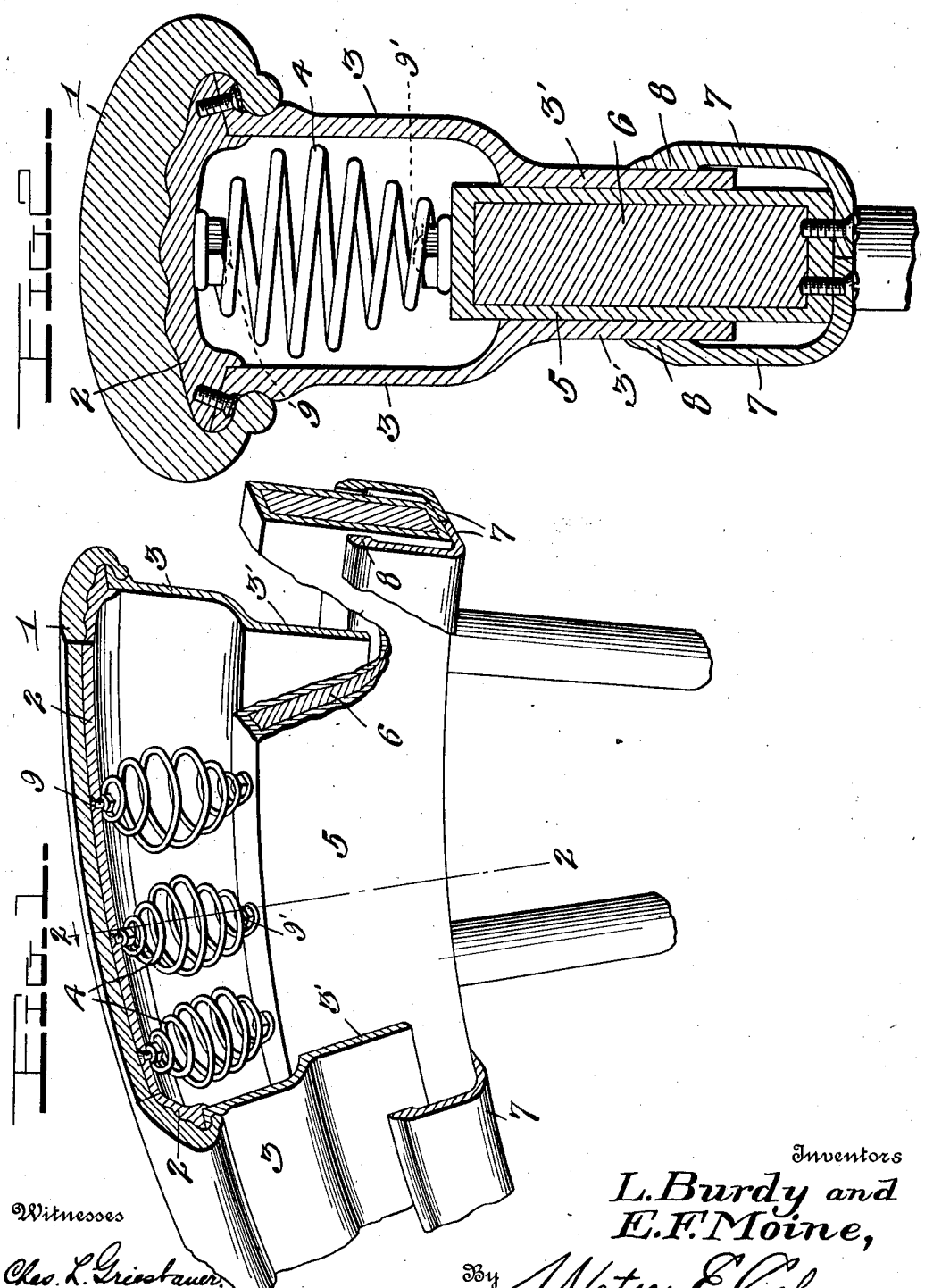
Witnesses
Chas. L. Griesbauer.
L. H. Ellis.
Inventors
L. Burdy and
E. F. Moine,
By Watson E. Coleman.
Attorney

UNITED STATES PATENT OFFICE.

LOUIS BURDY AND EMILE F. MOINE, OF EUREKA, CALIFORNIA.

RESILIENT WHEEL.

1,026,903.          Specification of Letters Patent.          Patented May 21, 1912.

Application filed June 14, 1911. Serial No. 633,032.

*To all whom it may concern:*

Be it known that we, LOUIS BURDY and EMILE F. MOINE, citizens of the United States, residing at Eureka, in the county of Humboldt and State of California, have invented certain new and useful Improvements in Resilient Wheels, of which the following is a specification, reference being had to the accompanying drawings.

This invention relates to resilient wheels and has for its object to provide means whereby it will not be necessary to provide a pneumatic tire, such as is customary with automobile wheels and other vehicles.

Another object of the invention is to provide means whereby the resilient means will be held securely in position and also of comparatively small size, and take up a relatively small amount of space.

Another object of the invention is to have the arrangement of parts so that they can be readily inspected and repaired.

Other objects of this invention will become apparent as it is more fully set forth.

It is well known that in the ordinary class of resilient wheels, that they have comparatively large springs, or other resilient means which take up a large amount of space in the wheel, which makes them more or less objectionable. In our wheel we provide very small springs and increase their number so that they are disposed in a small space and give a resilient effect, which is similar to that derived from a pneumatic tire.

Arrangements are also provided in this invention so that the resilient means or springs will be reinforced by a pneumatic action, caused by the operation of the rim attached to the springs reciprocating in the casing which contains the springs.

In the accompanying drawings which illustrate by way of example an embodiment of our invention, Figure 1 represents a perspective view of a portion of a wheel partly in section having resilient means disposed therein as embodied in this invention; and Fig. 2 is a sectional view and detail along the line 2—2 of Fig. 1.

Similar reference characters refer to similar parts throughout the drawings.

In the construction which is illustrated in the drawings 1 represents a usual type of tire, which is secured to a wheel rim 2 in any well known manner. The rim 2 has a pair of annular plates 3 secured to it which are formed and spaced apart to receive springs 4 in their outer portions, and restricted in their inner portion 3', in order to closely embrace the sides of the rim 5 which is mounted on the outer end portions of the spokes of the wheel, and arranged to hold the inner ends of the springs 4. This is an inner rim preferably of wood for the purpose of stengthening the rim 5. A pair of plates 7 are secured to the rim 5 of the wheel and arranged so that their outer ends 8 will frictionally engage with the outside surfaces of the annular plates 3.

9 and 9' are bolts or the like for securing the ends of the springs 4 to the rim 2 and the casing 5 respectively. The spiral springs 4 are firmly affixed in a row between the outer edge of said rim or felly and the peripheral metal plate or band 2 by bolts.

When the load is applied to the hub it forces rim 5 between the annular plates 3, thus compressing the under springs, while at the same time tensioning the top springs. While the wheel is in motion the annular plates are constantly playing between the rim 5 and plates 7. The frictional action of the plates 7 serves to steady the action of the springs on the wheel and reduce the tendency to vibrate which resilient wheels generally have.

By arranging the wheel so that the air between the rim and peripheral portions can circulate, as it were, a better effect is obtained in the wheel, as the air in such cases cannot give a reacting movement, which is often objectionable especially when a vehicle passes over a large stone, because of the up and down motion which continues for some time afterward.

This style of wheel has many advantages; but those principally evident, are that its parts are easily accessible for inspection and repair, secondly, the resilient means are positive in their action, thirdly, the jar is greatly eliminated by means of the pneumatic arrangement provided therein and the general design of the wheel makes it unnecessary to use a rubber tire or other tire made of resilient material.

Having thus described this invention it is claimed:

In a resilient wheel, the combination of a rim having relatively straight sides, a plurality of annular rings disposed on said sides, and having their lower portions flattened and relatively straight so as to closely embrace the sides, said rings having their upper portions flared and provided with holes therein, a peripheral portion arranged to conform with said flared portion of the rings and provided with threaded holes therein arranged to come into registry with the holes in said rings and provided with lugs arranged to engage with the inner surfaces of said rings, fastening means disposed in said holes for holding said rings and peripheral portion together, a plurality of ring plates secured to the under portion of said rim, arranged to extend outwardly by the sides of said rim, said plates being arranged to permit said annular rings to move freely between them and the ring, and having their outermost portions extending inwardly into engagement with the outside surfaces of said annular rings, and a plurality of coiled springs secured to said rim and peripheral portions.

In testimony whereof we hereunto affix our signatures in the presence of two witnesses.

LOUIS BURDY.
EMILE F. MOINE.

Witnesses:
A. C. NOE,
R. J. SANDERS.

Copies of this patent may be obtained for five cents each, by addressing the "Commissioner of Patents, Washington, D. C."